United States Patent
Gyobu

(10) Patent No.: US 7,991,208 B2
(45) Date of Patent: Aug. 2, 2011

(54) METHOD AND DEVICE FOR PROCESSING IMAGE

(75) Inventor: Yoshikazu Gyobu, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 942 days.

(21) Appl. No.: 11/775,491

(22) Filed: Jul. 10, 2007

(65) Prior Publication Data

US 2008/0013785 A1 Jan. 17, 2008

(30) Foreign Application Priority Data

Jul. 11, 2006 (JP) ................................. 2006-190723

(51) Int. Cl.
*G06K 9/00* (2006.01)
(52) U.S. Cl. ....................................................... 382/128
(58) Field of Classification Search .................. 382/100, 382/232–253; 380/200–242; 358/426.01–426.16; 354/555; 348/384.1–440.1; 375/122, 240.01–240.29
See application file for complete search history.

(56) References Cited

U.S. PATENT DOCUMENTS

| | | | | |
|---|---|---|---|---|
| 2002/0116618 A1* | 8/2002 | Muratani | | 713/176 |
| 2002/0120849 A1* | 8/2002 | McKinley et al. | | 713/176 |
| 2002/0172496 A1* | 11/2002 | Gunji et al. | | 386/46 |
| 2003/0210803 A1* | 11/2003 | Kaneda et al. | | 382/100 |
| 2006/0072782 A1* | 4/2006 | Abe et al. | | 382/100 |

FOREIGN PATENT DOCUMENTS

| | | |
|---|---|---|
| JP | 2001-197297 | 7/2001 |
| JP | 2004-112357 | 4/2004 |
| JP | 2005-295519 | 10/2005 |

OTHER PUBLICATIONS

Office Action issued Jan. 25, 2011, in Japanese Patent Application No. 2006-190723.

* cited by examiner

*Primary Examiner* — Samir A Ahmed
*Assistant Examiner* — Atiba O Fitzpatrick
(74) *Attorney, Agent, or Firm* — Oblon, Spivak, McClelland, Maier & Neustadt, L.L.P.

(57) ABSTRACT

A watermark generating unit divides an image to be processed into a plurality of regions smaller than the image. The watermark generating unit generates an inner-region image by performing first image processing on an inner image in each region of the image. The watermark generating unit performs mask processing on an outer-region pattern, and generates an outer-region image by performing second image processing on an outer image in the region. Based on the inner-region image and the outer-region image, the watermark generating unit generates a watermark image.

20 Claims, 10 Drawing Sheets

METHOD AND DEVICE FOR PROCESSING IMAGE

CROSS-REFERENCE TO RELATED APPLICATIONS

The present application claims priority to and incorporates by reference the entire contents of Japanese priority document, 2006-190723 filed in Japan on Jul. 11, 2006.

BACKGROUND OF THE INVENTION

1. Field of the Invention

The present invention relates to a method and device for generating a watermark-image data.

2. Description of the Related Art

A watermark printed on the background of an image or the like has been used as a pattern for preventing unauthorized copying. Because of the usefulness of the watermark, there has been an increasing demand for a method of efficiently generating watermark-image data.

Japanese Patent Application Laid-open No. 2005-295519, for example, discloses a conventional image processing device that generates a plurality of types of watermark images including a falsification-examination image and an unauthorized-copy examination image, and that superposes the images to generate a superposed image.

The conventional image processing device, however, generates data on a superposed image on a page basis. Generation of such a page-basis watermark-image data, which is not suitable for data compression, imposes a heavy load on a central processing unit (CPU).

SUMMARY OF THE INVENTION

It is an object of the present invention to at least partially solve the problems in the conventional technology.

According to an aspect of the present invention, an image processing device includes a first storing unit that stores therein an inner-region pattern that is applied to an inner region of an image to be processed, a second storing unit that stores therein an outer-region pattern that is applied to an outer region of the image, a third storing unit that stores therein a mask pattern, a dividing unit that divides the image into a plurality of regions, a first generating unit that generates an inner-region image by performing first image processing on the inner region in each of the regions with the inner-region pattern, a second generating unit that generates an outer-region image by masking the outer-region pattern with the mask pattern to obtain a masked outer-region pattern, and performing second image processing on the outer region in each of the regions with the masked outer-region pattern, and a third generating unit that generates a watermark image based on the inner-region image and the outer-region image.

According to another aspect of the present invention, a method of processing an image includes setting an inner-region pattern that is applied to an inner region of an image to be processed, setting an outer-region pattern that is applied to an outer region of the image, setting a mask pattern, dividing the image into a plurality of regions, generating an inner-region image by performing first image processing on the inner region in each of the regions with the inner-region pattern, masking the outer-region pattern with the mask pattern to obtain a masked outer-region pattern, generating an outer-region image by performing second image processing on the outer region in each of the regions with the masked outer-region pattern, and generating a watermark image based on the inner-region image and the outer-region image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

In the following description, as an example, a watermark stamp image (watermark image) is generated based on a stamp image (image) such that the stamp image is to be displayed independently and in front of a background image.

Figure 1:
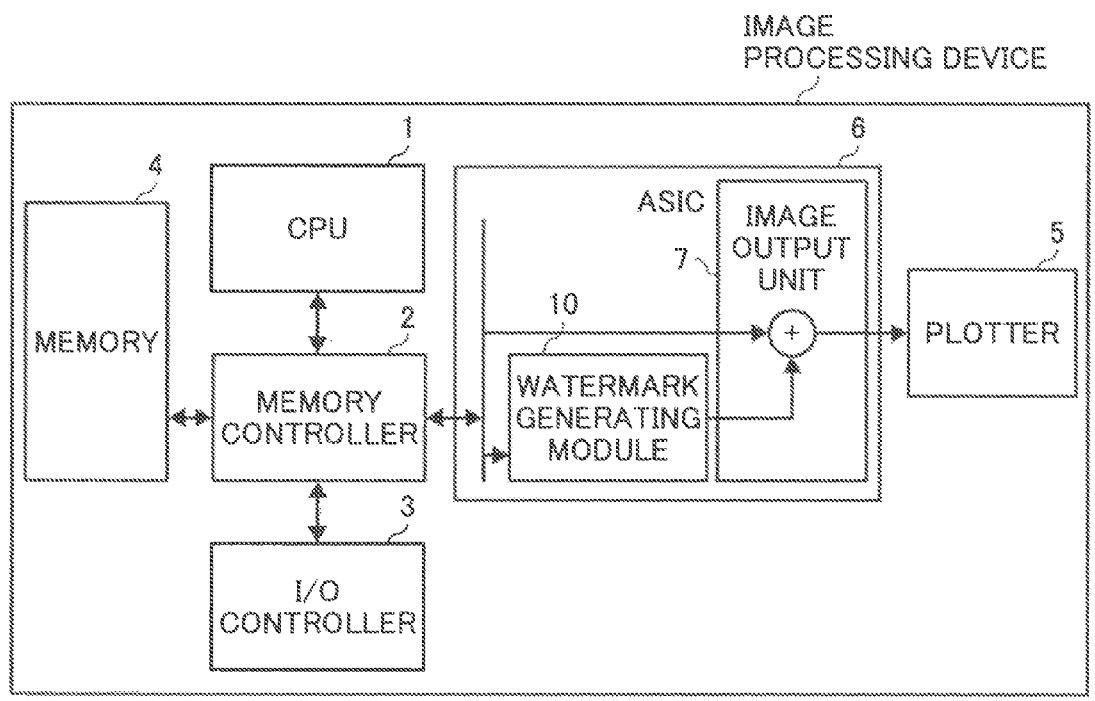
FIG. 1 is a functional block diagram of an image processing device according to a first embodiment of the present invention.

FIG. 1 is a functional block diagram of an image processing device according to a first embodiment of the present invention. The image processing device includes a CPU 1, a memory controller 2, an input/output (I/O) controller 3, a memory 4, a plotter 5, and an application specified integrated circuit (ASIC) 6. The ASIC 6 includes a watermark generating module 10 and an image output unit (combining unit) 7.

The CPU 1 executes a computer program to implement image processing on the image processing device. The memory 4 stores therein various types of computer programs that are executed by the CPU 1 and a stamp image.

The CPU 1 controls the image processing device. The CPU 1 causes the memory controller 2 to read the stamp image from the memory 4, and also issues read/write commands for reading and writing various types of data. The I/O controller 3 controls exchange of data with an external device.

Figure 2:
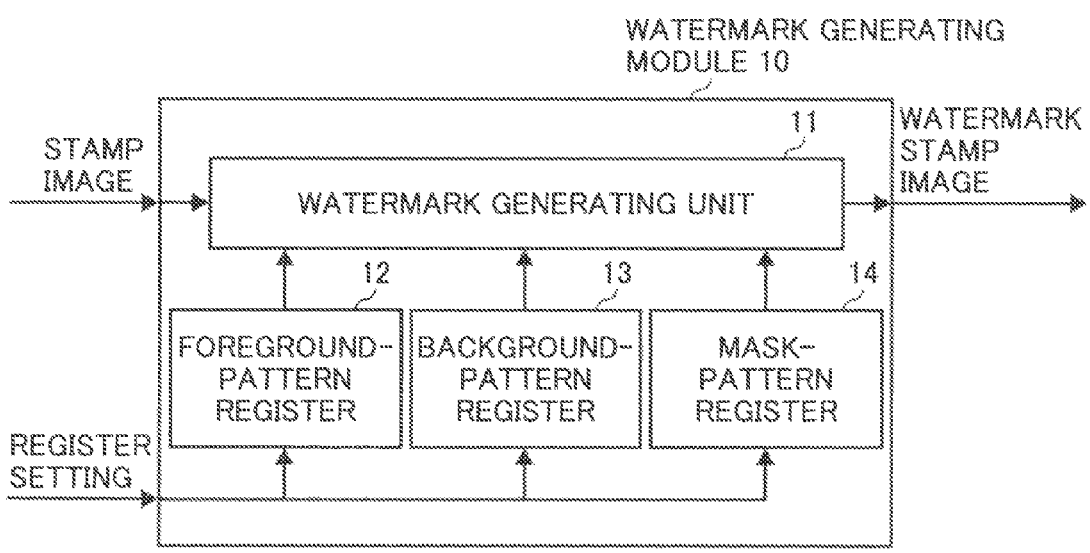
FIG. 2 is a functional block diagram of a watermark generating module shown in FIG. 1.

FIG. 2 is a functional block diagram of the watermark generating module 10. The watermark generating module 10 is hardware that includes a watermark generating unit 11, a foreground-pattern register 12, a background-pattern register 13, and a mask-pattern register 14. The CPU 1 functions as a setting unit that sets a foreground pattern in the foreground-pattern register 12, a background pattern in the background-pattern register 13, and a mask pattern in the mask-pattern register 14.

A watermark stamp image is not suitable for data compression. If the CPU 1 generates a watermark stamp image in the size of an original image to be combined with the watermark stamp image, a heavy load is imposed on the CPU 1. To reduce the load on the CPU 1, according to the first embodiment, each of the patterns is set in each of the registers, and the patterns are sequentially combined with the stamp image on a small region basis. In other words, the stamp image is divided into portions in a smaller size, and the portions are sequentially combined with the patterns to generate watermark stamp images. Then, a watermark stamp image in the size of the original image is generated from the watermark stamp images.

The ASIC 6 outputs combined image data obtained by combining the original image and the watermark stamp image. The plotter 5 receives the combined image data and prints the combined image data.

The CPU 1 causes the memory controller 2 to write data on a foreground pattern to the foreground-pattern register 12 so that the foreground pattern is set. Similarly, the CPU 1 causes the memory controller 2 to write and set a background pattern and a mask pattern respectively in the background-pattern register 13 and the mask-pattern register 14. It suffices that each of the registers can store therein data even temporarily, and can be, for example, a random access memory (RAM) that is a disk array.

The CPU 1 causes the memory controller 2 to send the stamp image data from the memory 4 to the watermark generating unit 11. The watermark generating unit 11 generates a foreground stamp image (inner-region image) based on the stamp image and the foreground pattern set in the foreground-pattern register 12.

More specifically, the watermark generating unit 11 generates the foreground stamp image by applying, via an AND circuit, an AND operation to bits of a pixel (hereinafter, "pixel bits") in a region of the stamp image (inner region) and pixel bits of the foreground pattern.

To generate a background stamp image (outer-region image), the watermark generating unit 11 first performs, on the background pattern set in the background-pattern register 13, mask-pattern processing with the mask pattern set in the mask-pattern register 14 to generate a masked background pattern. Based on the masked background pattern and the stamp image, the watermark generating unit 11 generates the background stamp image.

More specifically, the watermark generating unit 11 performs the mask processing by applying, via an AND circuit, an AND operation to pixel bits of the background pattern and pixel bits of the mask pattern to generate the masked background pattern. Thereafter, the watermark generating unit 11 applies, via an AND circuit, an AND operation to pixel bits of the masked background pattern and pixel bits in a region outside the stamp image (outer region) to generate the background stamp image.

The watermark generating unit 11 can be configured to generate the background stamp image by applying, via an AND circuit, an AND operation to the pixel bits in the outer region, the pixel bits of the background pattern, and the pixel bits of the mask pattern.

After generating the background stamp image, the watermark generating unit 11 generates a watermark stamp image by applying, via an OR circuit, an OR operation to pixel bits of the foreground stamp image and pixel bits of the background stamp image.

Data on the watermark stamp image is added to data on a video output image that is an original image, and accordingly, data on a combined image (an image with a watermark) is generated.

Figure 3:
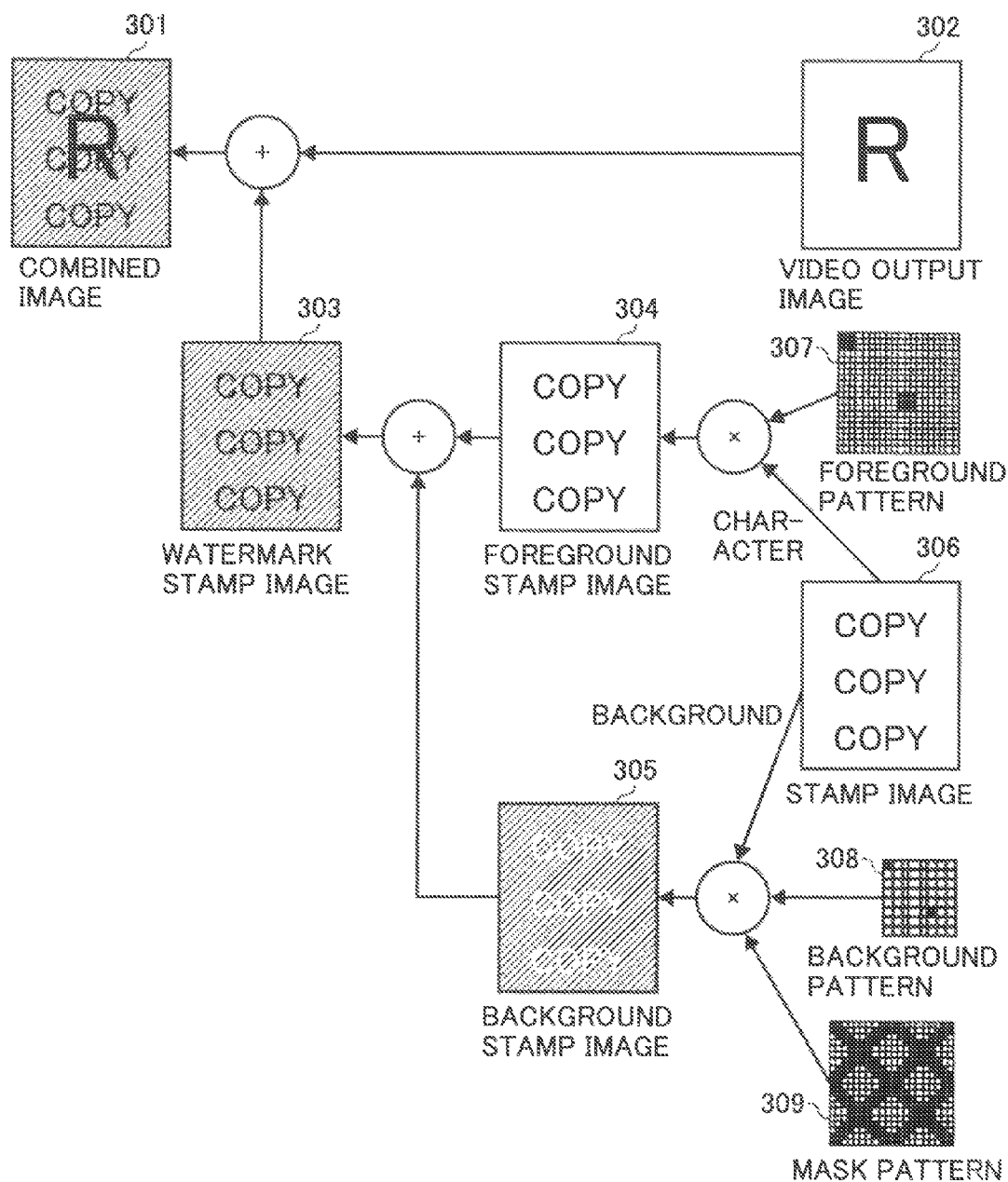
FIGS. 3 and 4 are schematic diagrams for explaining an algorithm for generating a watermark stamp image.

FIG. 3 is a schematic diagram for explaining an algorithm for generating a watermark stamp image. In the example of FIG. 3, a watermark stamp image is generated based on a stamp image formed of strings of characters "COPY". A combined image 301 is obtained by combining a video output image 302 and a watermark stamp image 303 by an OR operation. The video output image 302 is an original image to be output, and is, for example, an image scanned by a scanner.

The watermark stamp image 303 is obtained by combining a foreground stamp image 304 and a background stamp image 305 by an OR operation. The foreground stamp image 304 is visible, and the background stamp image 305 is invisible on a copy print.

The foreground stamp image 304 is an image obtained by applying an AND operation to the pixel bits of characters (inner region) of a stamp image 306 and the pixel bits of a foreground pattern 307 that gives a raised appearance to the stamp image 306 on a copy print. The stamp image 306 is formed of strings of characters of, for example, "COPY" representing a printed matter is a copy of an original image, or "COPY PROHIBITED" warning that copying of the original image is prohibited. The stamp image 306 appears on a print as if an image is stamped; however, it is not a real stamp.

The background stamp image 305 is obtained in the following manner. First, the mask processing is performed by applying an AND operation to a background pattern 308, which makes the background stamp image 305 invisible on a copy print, and a mask pattern 309 for making the watermark stamp image 303 less noticeable. Thereafter, an AND operation is applied to the background (outer region) of the stamp image 306 and the masked background pattern 308.

The foreground pattern 307, the background pattern 308, and the mask pattern 309 that are set in the respective registers are determined depending on the selection made by the user and the model of the image processing device. Because each pattern has a small size, the patterns are set in the minimum unit in the respective registers.

Instead of setting each pattern in each resister, each pattern can be previously stored in the memory 4 and input by using a direct memory access (DMA) controller. However, in this method, the process for controlling the DMA controller is complicated and the number of memory accesses increases, and thus, this method is not adopted in the first embodiment.

The watermark generating unit 11 reads the stamp image 306 from the memory 4 through the memory controller 2 before generating the background stamp image 305. This process control is not different from a typical method of generating a combined image. The watermark generating unit 11 applies an AND operation to the background image of the stamp image 306 and the masked background pattern 308 to generate the background stamp image 305. The background stamp image 305 is then output to the next circuit. It suffices that an internal buffer memory has a capacity equivalent to a word that is a transfer unit.

When the foreground stamp image 304 is generated, first, the CPU 1 sets the foreground pattern 307 in the foreground pattern register 12.

The watermark generating unit 11 reads the stamp image 306 from the memory 4, and generates the foreground stamp image 304. This operation is performed in parallel with that for generating the background stamp image 305. To generate the foreground stamp image 304, an AND operation is applied to the character image of the stamp image 306 and the foreground pattern 307. The foreground stamp image 304 is then output to the next circuit. It suffices that an internal buffer memory has a capacity equivalent to a word that is a transfer unit.

The watermark stamp image 303 is generated by applying an OR operation to the foreground stamp image 304 and the background stamp image 305 that are output from the previous circuits. The watermark stamp image 303 is then output to the image output unit 7. It suffices that an internal buffer memory has a capacity equivalent to a word that is a transfer unit.

The image output unit 7 generates a combined image as follows. Through the memory controller 2, the image output unit 7 reads, from the memory 4, the video output image 302 that is previously stored therein. The image output unit 7 combines the video output image 302 with the watermark stamp image 303 output from the watermark generating unit 11 to generate the combined image, and outputs the combine image. Such image generation can be realized by an existing video image combining-output function of the image output unit 7.

Figure 4:
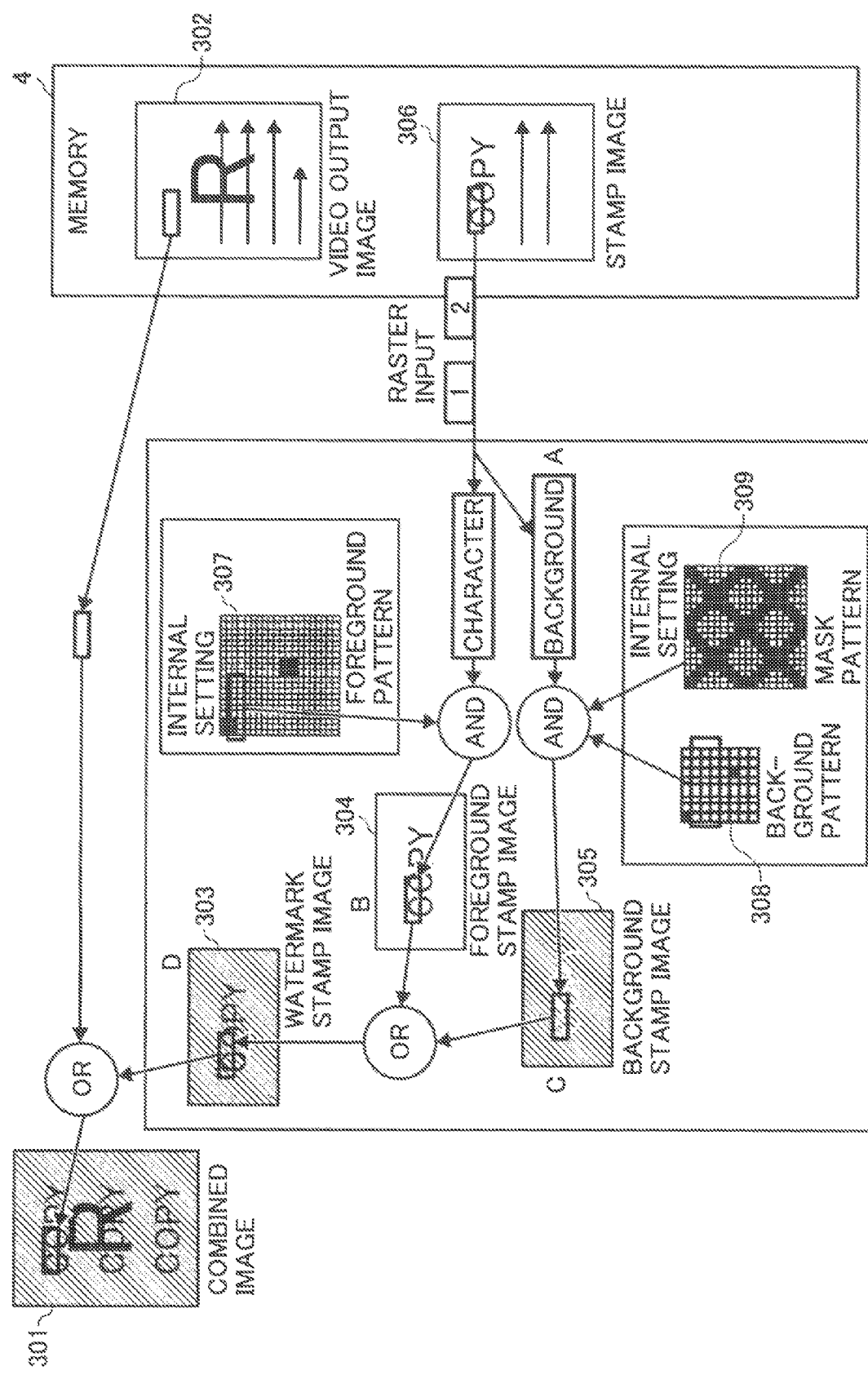
Figure 5:
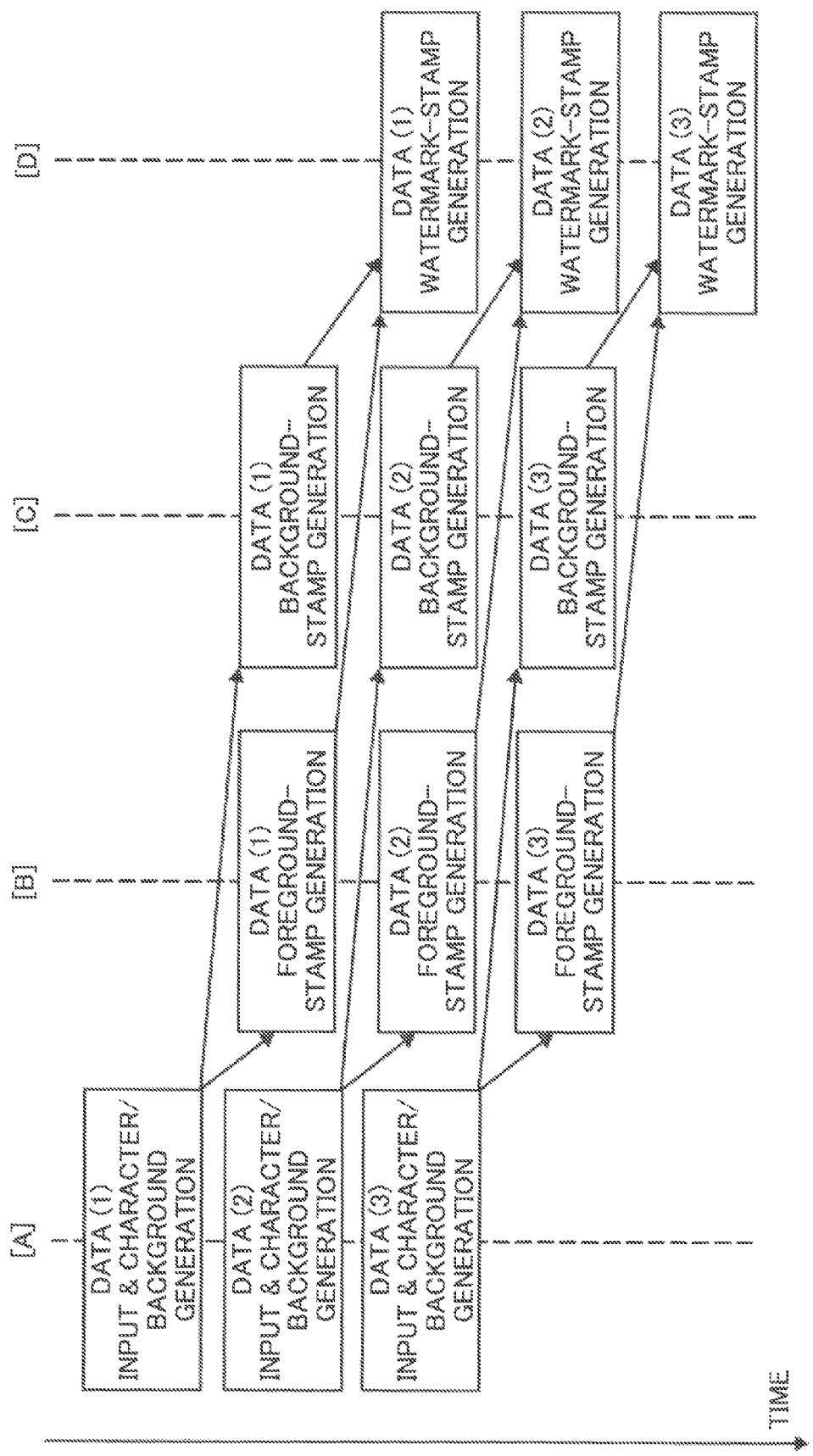
FIG. 5 is a schematic diagram for chronologically explaining the algorithm for generating a watermark stamp image.

FIG. 4 is another schematic diagram for explaining the algorithm for generating a watermark stamp image. FIG. 5 is a schematic diagram for chronologically explaining the algorithm for generating a watermark stamp image. Steps A to D of the algorithm are explained in detail below with reference to FIGS. 4 and 5.

At Step A, the stamp image 306 that is stored in the memory 4 is input as a raster image, and data on the characters of the stamp image 306 and data on the background image thereof are separately generated. At Step B, an AND operation is applied to the characters of the stamp image 306 and the foreground pattern 307 to generate the foreground stamp image 304.

At Step C, an AND operation is applied to the background of the characters, the background pattern 308, and the mask pattern 309 to generate the masked background stamp image 305. At Step D, an OR operation is applied to the foreground stamp image 304 and the background stamp image 305 to generate the watermark stamp image 303. Steps A to D are performed in parallel for each small region of the stamp image 306.

Data (1), (2), and (3) of small regions of the stamp image 306 shown in FIG. 5 are processed in parallel at Steps A to D.

With this configuration, watermark stamp images each corresponding to a small region of the stamp image are generated with pattern data in a small volume. Because a watermark stamp is not suitable for data compression, a watermark stamp image in the size of the entire original image is not generated. Hence, a load on the CPU 1 can be reduced.

Figure 6:
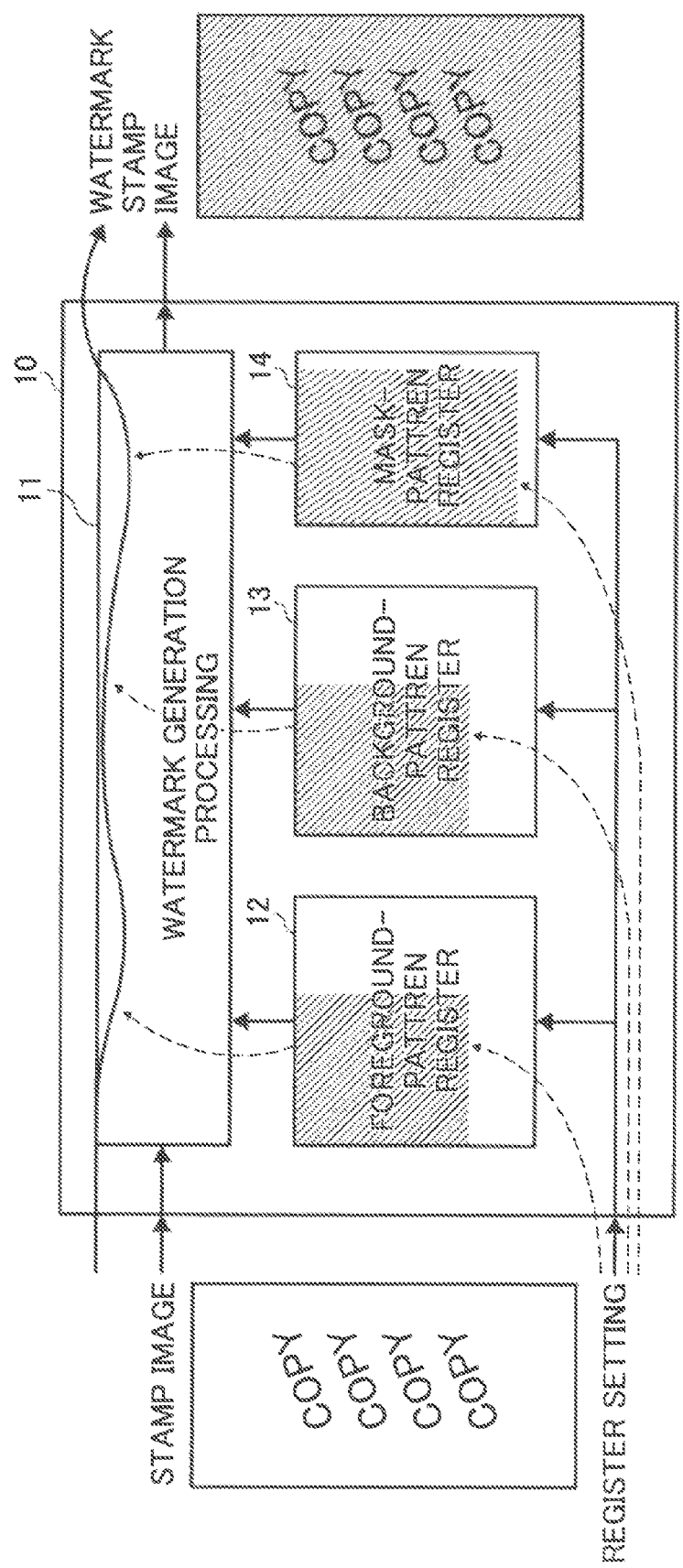
FIG. 6 is a schematic diagram for explaining a flow of image data in the process of watermark generation performed by a watermark generating unit shown in FIG. 2.

FIG. 6 is a schematic diagram for explaining a flow of image data in the process of watermark generation. Upon receiving a stamp image, the watermark generating unit 11 performs foreground-pattern processing on the stamp image with the foreground pattern stored in the foreground-pattern register 12. Similarly, the watermark generating unit 11 performs background-pattern processing on the stamp image with the background pattern stored in the background-pattern register 13. The watermark generating unit 11 performs mask-pattern processing on the background pattern with the mask pattern stored in the mask-pattern register 14. Each type of pattern processing is performed as already explained in detail above.

Figure 7:
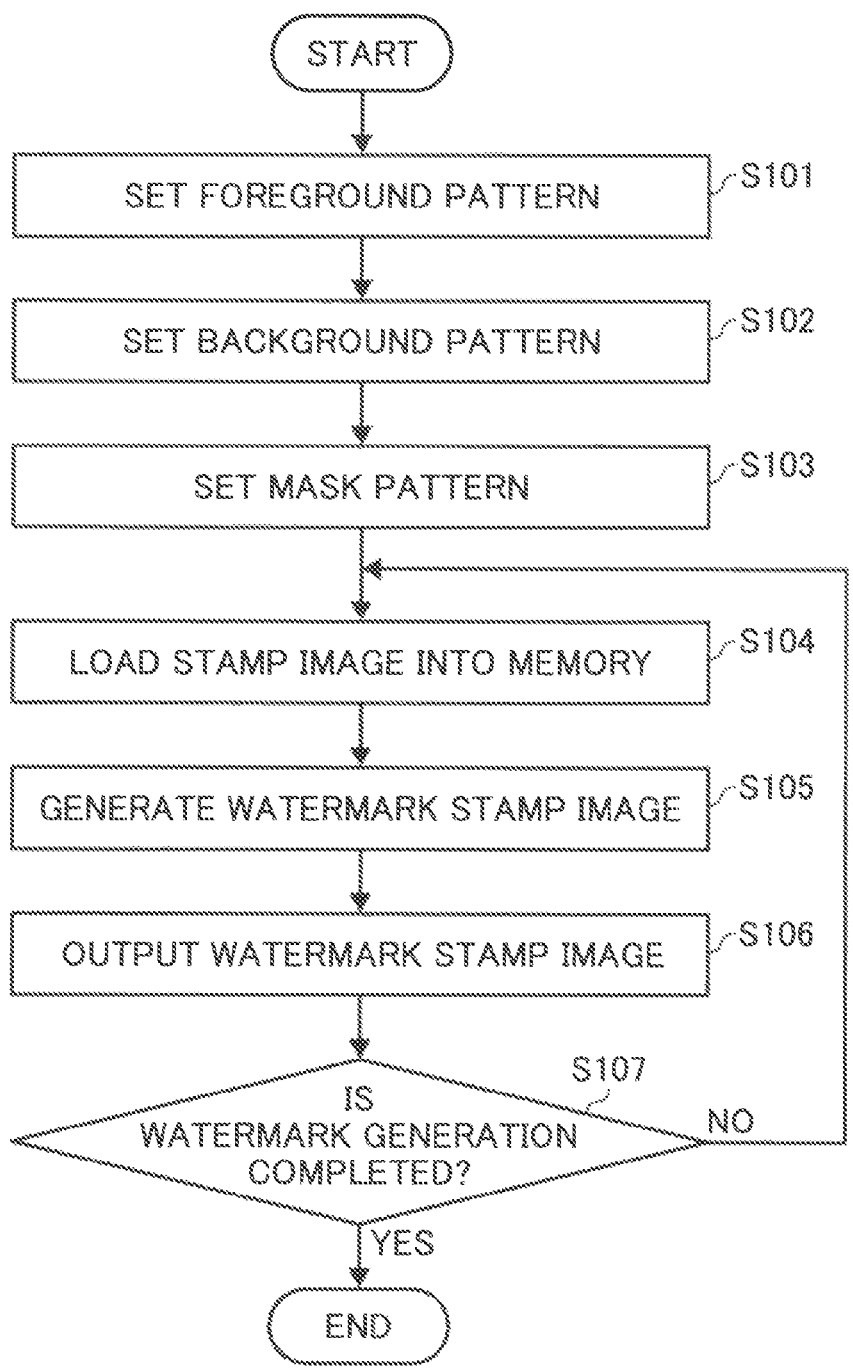
FIG. 7 is a flowchart of a process procedure of the watermark generation.

FIG. 7 is a flowchart of a process procedure of the watermark generation according to the first embodiment. The memory controller 2 sets a foreground pattern in the foreground-pattern register 12 (step S101). The memory controller 2 sets a background pattern in the background-pattern register 13 (step S102).

The memory controller 2 sets a mask pattern in the mask-pattern register 14 (step S103). The memory controller 2 loads a stamp image into the memory 4 (step S104). As explained with reference to FIG. 6, the watermark generating unit 11 generates a watermark stamp image based on the stamp image (step S105), and outputs the watermark stamp image (step S106). The watermark generating unit 11 judges whether the generation of the set watermark stamp image is completed (step S107). If the generation is not completed (No in step S107), the process control returns to step S104.

The image output unit 7 combines a video image to be output and the watermark stamp image output from the watermark generating unit 11 to obtain a combined video image. The combined video image is then sent to the plotter 5, and printed out through print processing.

It is desirable that the image output unit 7 include an input-video shifting unit (not shown) for arbitrarily shifting the video image up and down and left and right while the video image is being combined with the watermark stamp image.

It is also desirable that the image output unit 7 include an input-video shifting unit (not shown) for arbitrarily shifting the combined video image up and down and left and right before the combined video image is output to the plotter 5.

As explained above, according to the first embodiment, the foreground-stamp image processing, the background-image processing, and the mask-pattern processing are performed on a small region basis to generate a watermark stamp image. In other words, a stamp image is divided in small regions, and watermark stamp images, each corresponding to one of the small regions, are generated. From the watermark stamp images is obtained a watermark stamp image in full size, which includes a specific image as a visible foreground image and a masked background image. Hence, a load on the CPU 1 can be reduced compared with the case where the CPU 1 generates a watermark stamp image having a one-page size. Thus, high-speed generation of a watermark stamp image can be achieved with a simple configuration of the image processing device.

The watermark generating unit 11 is realized as hardware and includes the AND circuits and the OR circuit for generating a watermark stamp image. Therefore, the CPU 1 only needs to set a foreground pattern, a background pattern, a mask pattern in the respective foreground-pattern register 12, the background-pattern register 13, and the mask-pattern register 14, and issue commands for reading the stamp image from the memory 4 to the memory controller 2. Accordingly, the load on the CPU 1 involved in generating a watermark stamp image and a combined image can be further reduced.

Moreover, a watermark stamp image is generated based on a foreground stamp image and a background stamp image that is obtained by performing mask processing with a mask pattern on the background pattern. Accordingly, the background stamp image is invisible in the watermark stamp image.

Figure 8:
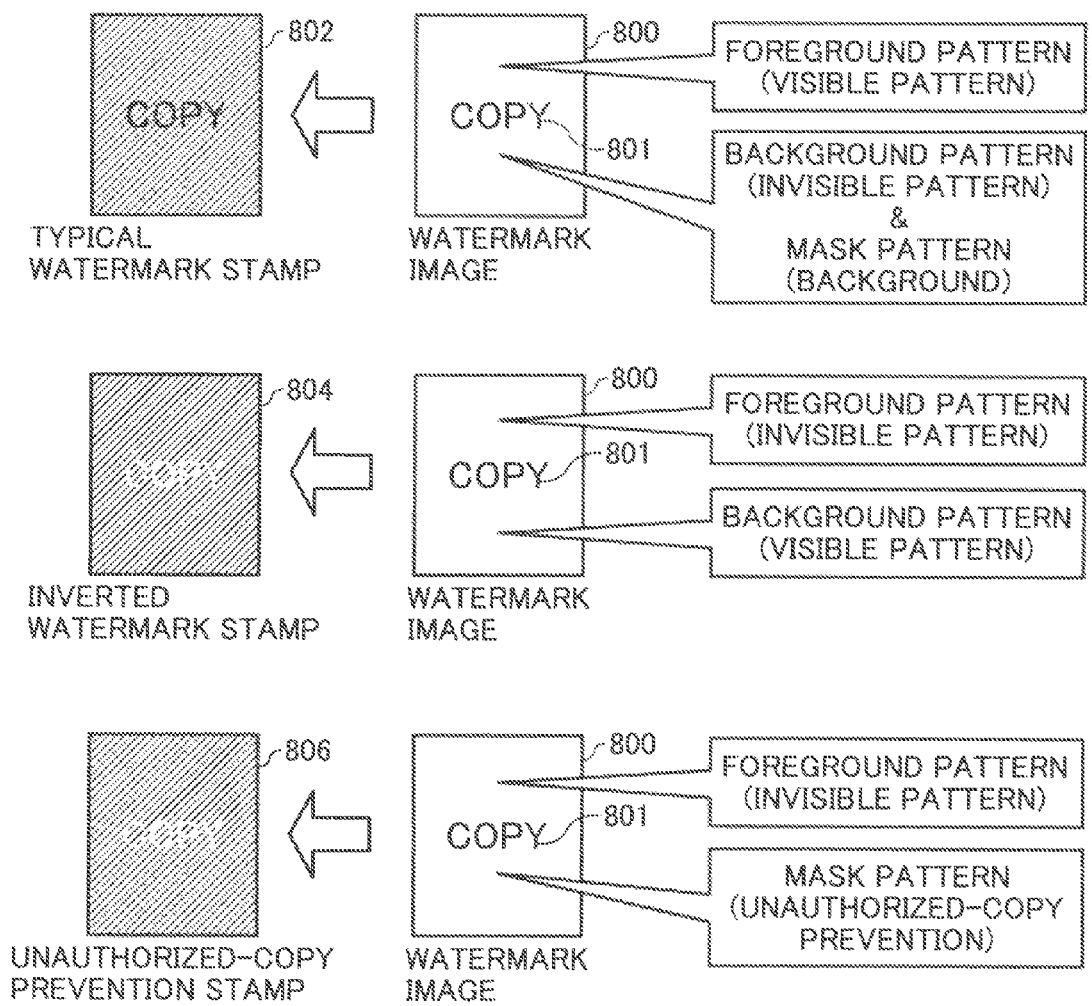
FIG. 8 is examples of watermark stamp images obtained by processing foreground and background of a stamp image.

FIG. 8 is examples of watermark stamp images that can be obtained by processing the foreground and background of a stamp image. In the examples, a watermark image 800 that has a stamp image 801 formed of a character string "COPY" embedded therein. A typical watermark stamp 802 is generated by using a foreground pattern that makes the stamp image 801 visible and a background pattern to which a mask pattern is applied and which makes the background of the stamp image 801 invisible.

An inverted watermark stamp 804 that is an inversion of the typical watermark stamp 802 is generated by using a foreground pattern that makes the stamp image 801 invisible and a background pattern that makes the background of the stamp image 801 visible.

An unauthorized-copy prevention stamp 806 is generated by using a foreground pattern that makes the stamp image 801 invisible and a mask pattern that provides the background of the stamp image 801 with unauthorized-copy prevention features.

An image processing device according to a second embodiment of the present invention is described below. Differently from the first embodiment, the image processing device according to the second embodiment further includes a pixel-bit setting unit (not shown) that sets the number of pixel bits of at least one of a stamp image, a foreground pattern, a background pattern, and a mask pattern to a desired value. The image processing device according to the second embodiment also includes a resolution setting unit that sets the resolution of a stamp image. Computer programs can be executed to realize the functions of the pixel-bit setting unit and the resolution setting unit. Such computer programs are stored in, for example, the memory 4 and executed by the CPU 1.

Figure 9:
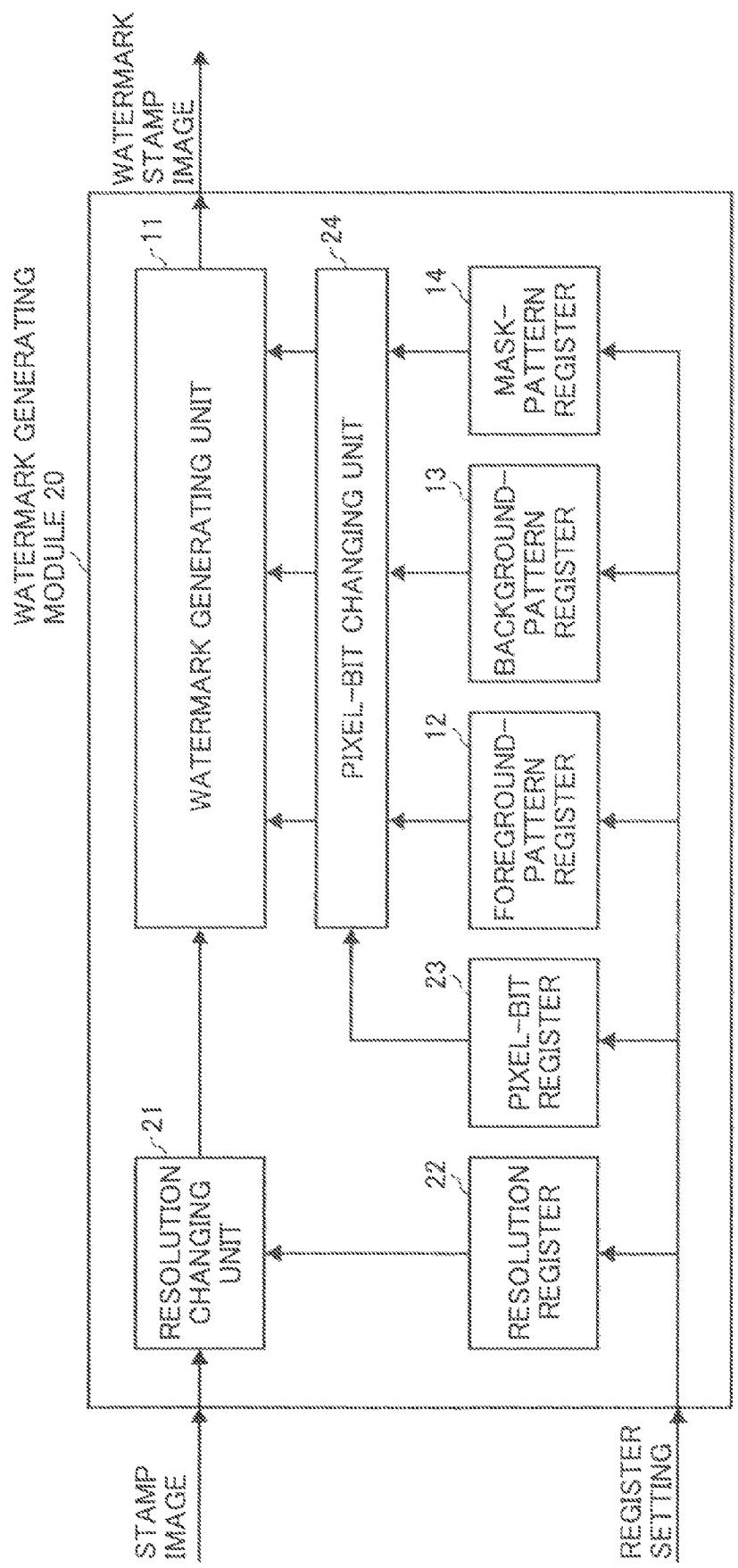
FIG. 9 is a functional block diagram of a watermark generating module of an image processing device according to a second embodiment of the present invention.

FIG. 9 is a functional block diagram of a watermark generating module 20 of the image processing device according to the second embodiment. The difference between the watermark generating module 20 and the watermark generating module 10 shown in FIG. 2 is described in detail below. The watermark generating module 20 includes a resolution changing unit 21, a resolution register 22, a pixel-bit register 23, and a pixel-bit changing unit 24. The pixel-bit setting unit (not shown) and the resolution setting unit (not shown) set a value in each of the resolution changing unit 21, the resolution register 22, the pixel-bit register 23, and the pixel-bit changing unit 24 according to the computer programs executed by the CPU 1.

The resolution register 22 stores therein a specified resolution value set by the resolution setting unit. The resolution changing unit 21 sets the low resolution of a stamp image that is stored in the memory 4 to a specified resolution value set in the resolution register 22. With this function of the resolution changing unit 21, a stamp image having a low resolution can be used. Accordingly, the size of the memory 4 occupied by a stamp image can be reduced.

The case where a stamp image has a low resolution is explained below with reference to FIG. 3. The stamp image 306 with a low resolution is read from the memory 4. Then, the resolution of the stamp image 306 is changed to a desired value before the foreground stamp image 304 and the background stamp image 305 are generated. Thus, the watermark stamp image 303 is generated.

The pixel-bit register 23 stores therein the number of pixel bits specified and set by the pixel-bit setting unit. The pixel-bit changing unit 24 changes 1-bit pixel pattern to a pattern of the specified number of pixel bits. Because of this function of the pixel-bit changing unit 24, it suffices that the RAM has a capacity of one bit required for each pattern. Accordingly, the internal memory can be reduced in size.

With the pixel-bit setting unit (not shown), the watermark generating unit 11 can generate watermark stamp images with various modes of a foreground pattern and a background pattern based on the number of pixel bits set by the pixel-bit setting unit.

In addition, as described above, the resolution setting unit makes it possible to use a stamp image having a lower resolution, thus reducing the size of the memory 4 occupied by a stamp image.

An image processing device according to a third embodiment of the present invention is described below. Differently from the first embodiment, the image processing device according to the third embodiment further includes a magnification-changing unit (not shown) that changes the magnification of a stamp image. A foreground pattern and a background pattern of a stamp image whose magnification has been changed are stored in the foreground pattern register 12 and the background-pattern register 13, respectively, and mask processing is performed on the background pattern.

Figure 10:
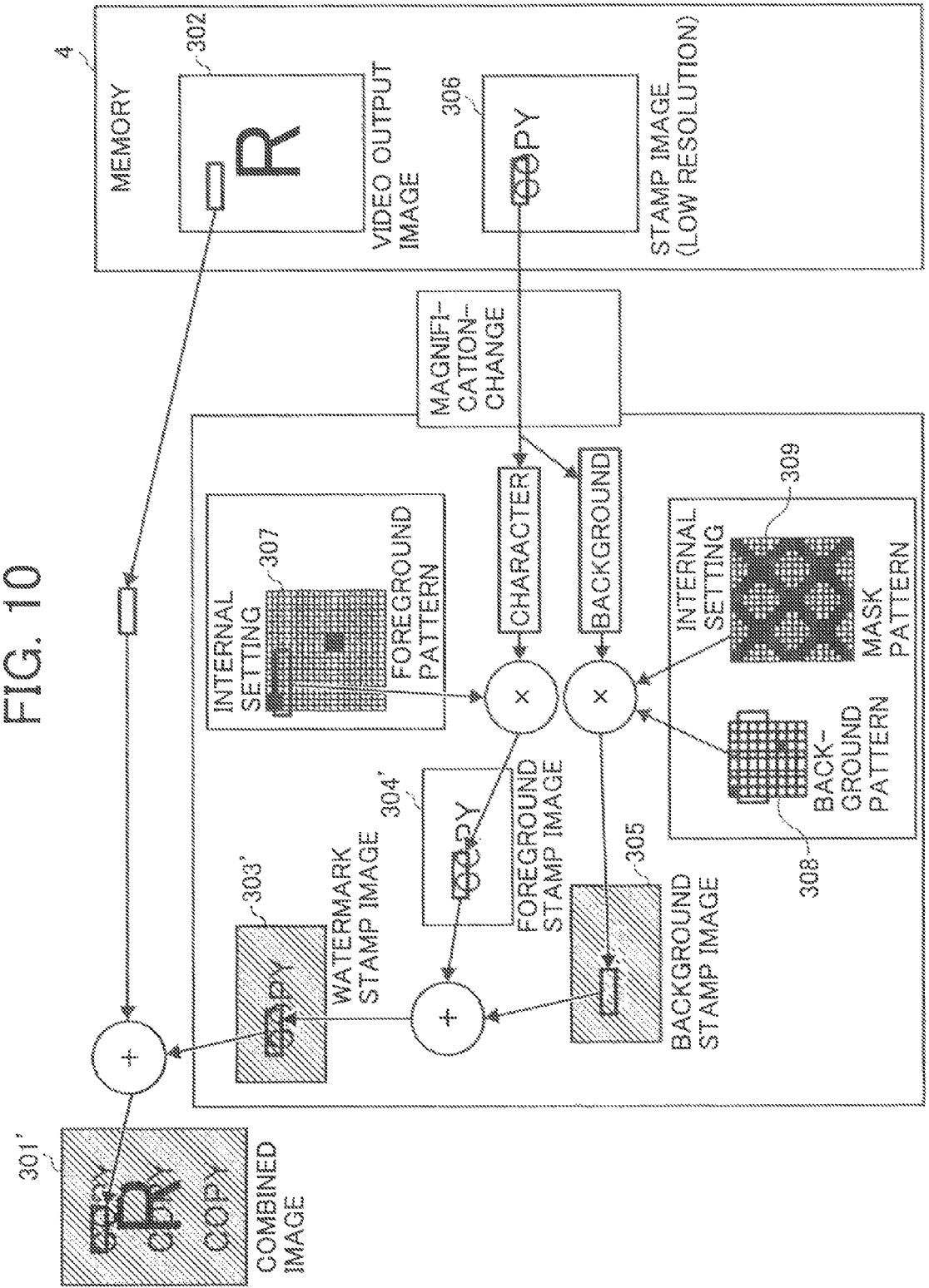
FIG. 10 is a schematic diagram for explaining the process of generating a watermark stamp image according to a third embodiment of the present invention.

FIG. 10 is a schematic diagram for explaining the process of generating a watermark stamp image after the magnification of a stamp image is changed. Although not shown in FIG. 10, the magnification-changing unit can be provided in the watermark generating module 10 such that the stamp image is input to the watermark generating unit 11 via the magnification changing unit. For example, instead of the resolution changing unit and the resolution register 22 according to the second embodiment, the magnification-changing unit and a magnification-value register can be provided. With this configuration, magnification-change processing can be performed on a stamp image to be input to the watermark generating module.

The case where a stamp image has a low resolution is explained with reference to FIG. 10. The stamp image 306 with a low resolution is read from the memory 4. Then, the magnification of the stamp image 306 is changed to a desired value to obtain the magnification-changed stamp image 306 before a foreground stamp image 304' and the background stamp image 305 are generated. Thus, the watermark stamp image 303' is generated.

With the magnification-changing unit, a combined image 3011 can be generated based on the magnification-changed stamp image 306. In other words, a combined image based on the stamp image 306 which is enlarged or reduced can be generated. Accordingly, the memory area necessary for the stamp image 306 can be reduced, and the memory in the image processing device can be effectively used.

An image processing device according to a fourth embodiment of the present invention is described below. Differently from the first embodiment, the image processing device according to the fourth embodiment further includes a switching unit that selects any one of a plurality of video output images of different colors from the memory 4. The selected video output image is combined with a watermark stamp image.

Because, as described, the switching unit realizes combining of only one video output image of a specified color with a watermark stamp image, the image processing device can be simplified.

Figure 11:
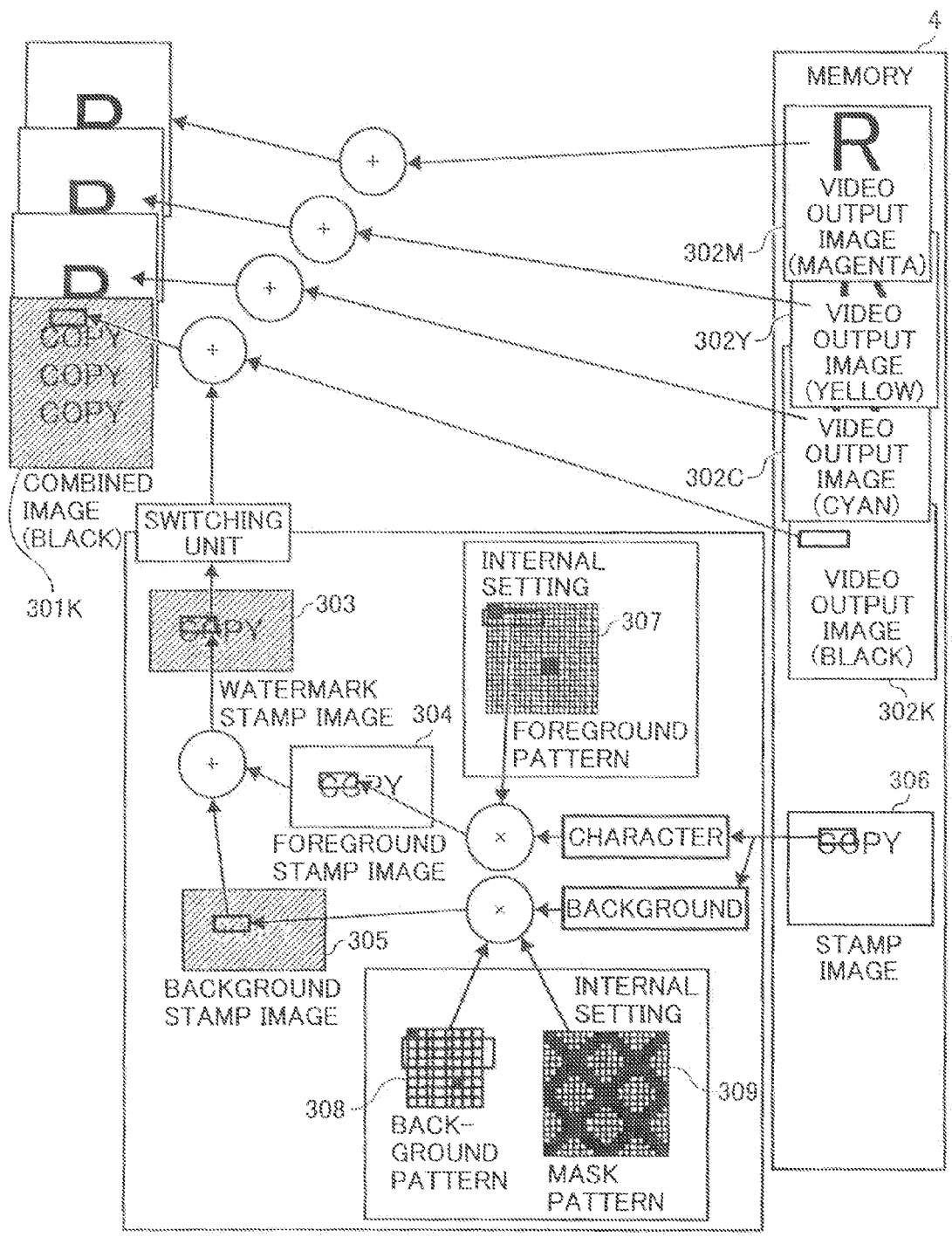
FIG. 11 is a schematic diagram for explaining image processing according to a fourth embodiment of the present invention.

FIG. 11 is a schematic diagram for explaining image processing according to the fourth embodiment. When the watermark stamp image 303 is combined with video output images 302M of magenta, 302Y of yellow, 302C of cyan, and 302K of black, the watermark stamp image 303 is first combined with, for example, the video output image 302K to generate a combined image 301K. Thereafter, the combined image 301K is combined with video output images 302M to 302C of other colors. As a result, the watermark stamp image 303 is combined with all the video output images 302M, 302Y, 302C, and 302K. Because of the function of the switching unit, the hardware size can be reduced.

The image processing devices according to the first to fourth embodiments can be applied to generate a watermark stamp image having a meta image that represents meta data as a stamp image. Besides, a watermark can be used as a stamp image to generate a watermark stamp image.

A pattern for preventing unauthorized copying can be set in the mask-pattern register 14 as a mask pattern of a background pattern. With such a mask pattern, a watermark stamp image that prevents unauthorized copying can be generated.

By combining an inner-region image and an outer-region image of a stamp image which have undergone image processing, a watermark stamp image that prevents unauthorized copying can be generated. In other words, depending on the combination of the inner-region image and the outer-region image, a watermark stamp image having a mask pattern that prevents unauthorized copying can be generated.

According to an aspect of the present invention, a watermark stamp image is generated with the simple configuration of the image processing device with less load on a CPU.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
    a processor that processes a specific image including an object image therein;
    a memory that is coupled to the processor and stores the specific image therein;
    a dividing unit that divides the specific image into a plurality of divided images,
        wherein
            some divided images have a portion of the object image therein as an object area, and
            other divided images have no portion of the object image therein as a no-object area,
    a first storing unit that stores therein an inner-region pattern for applying to the object area;
    a second storing unit that stores therein an outer-region pattern for applying to the no-object area;
    a third storing unit that stores therein a mask pattern for applying to the outer-region pattern;
    a first generating unit that generates an inner-region image by applying the inner-region pattern to the object area in each divided image;
    a second generating unit that generates an outer-region image
        by masking the outer-region pattern with the mask pattern to obtain a masked outer-region pattern, and
        by applying the masked outer-region pattern to the no-object area in each divided image; and
    a third generating unit that combines the inner-region image generated and the outer-region image generated so as to generate a watermark image in which the specific image is reflected.

2. The image processing device according to claim 1, further comprising:
    a pixel-bit data storing unit that stores therein pixel-bit data that indicates a specified number of bits of a pixel; and
    a pixel-bit changing unit that changes a number of bits of a pixel of the specific image based on the pixel-bit data to obtain a pixel-bit changed specific image, wherein
    the third generating unit generates the watermark image based on the pixel-bit changed specific image.

3. The image processing device according to claim 1, further comprising:
    a resolution storing unit that stores therein resolution data that indicates a specified resolution; and
    a resolution changing unit that changes resolution of the specific image based on the resolution data, wherein
    the third generating unit generates the watermark image based on the specific image of the specified resolution.

4. The image processing device according to claim 1, further comprising:
    a magnification-changing unit that changes magnification of the specific image, wherein
    the first storing unit stores therein an inner-region pattern that is applied to magnification-changed specific image, and
    the second storing unit stores therein an outer-region pattern that is applied to the magnification-changed specific image.

5. The image processing device according to claim 1, wherein the third generating unit generates watermark images of a plurality of colors.

6. The image processing device according to claim 1, further comprising:
    a combining unit that combines image data with the watermark image to generate combined image data.

7. The image processing device according to claim 6, wherein the watermark image corresponds to a specified color.

8. The image processing device according to claim 6, wherein the image data corresponds to a specified color.

9. The image processing device according to claim 6, further comprising:
    a shifting unit that shifts the specific image data up, down, left and right.

10. The image processing device according to claim 6, further comprising:
    a shifting unit that shifts the combined image data up, down, left and right.

11. The image processing device according to claim 1, wherein the specific image is a pattern image that prevents unauthorized copying.

12. The image processing device according to claim 1, wherein the specific image is a meta image that represents meta data.

13. The image processing device according to claim 1, wherein the specific image is a watermark.

14. The image processing device according to claim 1, wherein the mask pattern is a pattern that prevents unauthorized copying.

15. The image processing device according to claim 1, wherein the watermark image prevents unauthorized copying.

16. The image processing device according to claim 1, further comprising:
    a setting unit that sets the inner-region pattern in the first storing unit, the outer-region pattern in the second storing unit, and the mask pattern in the third storing unit.

17. The image processing device according to claim 16, further comprising:
    an application specified integrated circuit that includes the first storing unit, the second storing unit, the third storing unit, the first generating unit, the second generating unit, and the third generating unit.

18. The image processing device according to claim 17, wherein each of the first storing unit, the second storing unit, and the third storing unit is a register.

19. The image processing device according to claim 17, wherein
the first generating unit includes a first AND circuit that applies an AND operation to pixel bits of the inner region and pixel bits of the inner-region pattern,
the second generating unit includes a second AND circuit that applies an AND operation to pixel bits of the outer-region pattern and pixel bits of the mask pattern, and a third AND circuit that applies an AND operation to pixel bits of the outer region and pixel bits of the masked outer-region pattern, and
the third generating unit includes an OR circuit that applies an OR operation to pixel bits of the inner-region image and pixel bits of the outer-region image.

20. A method of processing an image for a computer provided with a processor and a memory based on a specific image that has an object image therein, the memory storing the specific image, comprising:
dividing the specific image into a plurality of divided images,
wherein
some divided images have a portion of the object image therein as an object area, and
other divided images have no portion of the object image therein as a no-object area,
first generating that generates an inner region image by applying an inner-region pattern to the object area in each divided image;
second generating that generates an outer-region image
by masking an outer-region pattern with a mask pattern to obtain a masked outer-region pattern, and
by applying the masked outer-region pattern to the no-object area in each divided image; and
third generating that combines the inner-region image generated and the outer-region image generated so as to generate a watermark image, in which the specific image is reflected.

* * * * *